(12) United States Patent
Pandey

(10) Patent No.: US 10,968,321 B2
(45) Date of Patent: Apr. 6, 2021

(54) POLYACRYLATE-POLYSILANE BLOCK COPOLYMERS

(71) Applicant: CLARIANT PLASTICS & COATINGS LTD, Muttenz (CH)

(72) Inventor: Someshwarnath Dinanath Pandey, Thane (IN)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 16/320,594

(22) PCT Filed: Jul. 17, 2017

(86) PCT No.: PCT/EP2017/068048
§ 371 (c)(1),
(2) Date: Jan. 25, 2019

(87) PCT Pub. No.: WO2018/019642
PCT Pub. Date: Feb. 1, 2018

(65) Prior Publication Data
US 2019/0161584 A1 May 30, 2019

(30) Foreign Application Priority Data

Jul. 27, 2016 (EP) .................................. 16181390

(51) Int. Cl.
*C08G 81/02* (2006.01)
*C08F 220/26* (2006.01)
(Continued)

(52) U.S. Cl.
CPC .............. *C08G 81/024* (2013.01); *C08F 8/42* (2013.01); *C08F 220/26* (2013.01);
(Continued)

(58) Field of Classification Search
CPC ........ C08F 8/42; C08F 230/08; C08F 293/00; C08F 295/00; C08F 297/00
See application file for complete search history.

(56) References Cited

U.S. PATENT DOCUMENTS

2006/0210929 A1* 9/2006 Yamada ................ G03F 7/0382
430/311
2012/0329940 A1* 12/2012 Shimanaka ............ C09B 68/41
524/547
(Continued)

FOREIGN PATENT DOCUMENTS

EP 0412770 A1 2/1991
JP H02-258815 10/1990
(Continued)

OTHER PUBLICATIONS

"Block Copolymers of y-Methacryloxypropyltrimethoxysilane and Methyl Methacrylate by RAFT Polymerization. A New Class of Polymeric Precursors for the Sol Gel Process." authored by Mellon et al. and published in Macromolecules (2005) 38, 1591-1598.*
European Polymer Journal (2007) 1736-1743.*
"Synthesis and Surface Properties of Silicone-MMA (methyl methacrylate) Graft Block Copolymers" authored by Inoue et al. and published in Nippon Setchaku Gakkaishi (1994) 30(4), 146-155.*
"Synthesis and Surface Properties of PDMS-containing Latexes by Emulsion Polymerization using AIN as the Initiator" authored by Zhang et al. and published in the European Polymer Journal (2013) 49, 2327-2333.*
(Continued)

*Primary Examiner* — Marc S Zimmer
(74) *Attorney, Agent, or Firm* — Morgan, Lewis & Bockius LLP

(57) ABSTRACT

The invention relates a polyacrylate-polysilane block copolymer of general structure (I): wherein m and n independent of one another, are integers ranging from 2 to 4000; p is an integer ranging from 0 to 5; q is an integer ranging from 1 to 5; $R^1$ represents hydrogen, straight-chain or branched alkyl group having 1 to 4 carbon atoms; $R^2$ represents hydrogen, straight-chain or branched alkyl group having 1 to 18 carbon atoms; R3 represents hydrogen, hydroxyl group, straight-chain or branched alkyl group having 1 to 4 carbon atoms, or an $C_6$-$C_{14}$ aryl group; L is a linking moiety representing amine (—NH—) group, amide (—C(O)NH—) group, urea (—NHC(O)NH—) group, urethane (—OC(O)NH—) group or methylene (—CH$_2$—) group; $R^4$, $R^5$ and $R^6$ independent of one another, represents hydrogen, straight-chain or branched, alkyl group having 1 to 8 carbon atoms or polydimethylsiloxane group; and $R^7$ represents hydrogen or methyl group.

(I)

13 Claims, No Drawings

(51) Int. Cl.
*C08G 77/442* (2006.01)
*C08F 230/08* (2006.01)
*C08F 8/42* (2006.01)
*C08F 4/04* (2006.01)

(52) U.S. Cl.
CPC .......... *C08F 230/08* (2013.01); *C08G 77/442* (2013.01); *C08F 4/04* (2013.01)

(56) References Cited

U.S. PATENT DOCUMENTS

| | | |
|---|---|---|
| 2013/0012653 A1 | 1/2013 | Liu |
| 2013/0171566 A1 | 7/2013 | Shu et al. |
| 2013/0209693 A1 | 8/2013 | Vogel et al. |
| 2015/0119526 A1 | 4/2015 | Watanabe et al. |
| 2015/0119536 A1 | 4/2015 | Liu |
| 2017/0158822 A1* | 6/2017 | Komatsu ................ G02F 1/167 |

FOREIGN PATENT DOCUMENTS

| | | |
|---|---|---|
| WO | 2010/124187 A2 | 10/2010 |
| WO | 2015/100194 A1 | 7/2015 |

OTHER PUBLICATIONS

International Search Report and Written Opinion dated Sep. 25, 2017, issued in corresponding International Patent Application No. PCT/EP2017/068048.

\* cited by examiner

POLYACRYLATE-POLYSILANE BLOCK COPOLYMERS

BACKGROUND

Field of the Invention

The invention relates to novel polyacrylate-polysilane block copolymers. The invention also relates to methods of preparation of the polyacrylate-polysilane block copolymers.

Description of the Related Art

Acrylate-based polymers are widely used for applications in adhesives, sealants and in coatings since they are relatively low-cost. One particular advantage of acrylate-based polymers is its compatibility with other polymers such as olefin-based polymers or copolymers like polypropylene. Silane-based polymers are relatively more expensive. They are non-compatible with many of the polymers. However, they have excellent thermo-oxidative stability, low surface energy and find applications as additives in coatings and plastics.

While individual silane and acrylate-based polymers have distinct advantages and drawbacks, a blend of them to form a hybrid polymer system is thermodynamically unstable and ultimately leads to macroscopic phase separation and change in the blend properties over time.

Copolymers of polyacrylate and Si-based monomers are known. For example, US-2015119536 A1 and US-2013012653 A1 describe silicone-acrylic copolymers prepared by reacting a mixture of a silicone polymer and mixtures of acrylic monomers with a radical initiator and a scrambling catalyst.

US-2015119526 A1 discloses an acrylic modified polyorganosiloxane obtained by emulsion and graft polymerisation of a mixture comprising polyorganosiloxane, a methacrylate monomer and a copolymerisable monomer having a carboxyl, amide, hydroxyl or vinyl functional group.

JPH-02258815 A describes a copolymer obtained by copolymerising triorganosilyl (meth)acrylate with a triorganosiloxysilylalkylene group-containing (meth)acrylate.

Block copolymers are a special class of copolymers that are made of blocks of different polymerized monomeric units. The block copolymers can combine the properties of the individual polymer types within themselves and are therefore very interesting for many applications. Therefore, it is desirable to provide a block copolymer that advantageously combines properties of both acrylate as well as silane polymers.

The present invention provides a polyacrylate-polysilane block copolymer of the general formula (I)

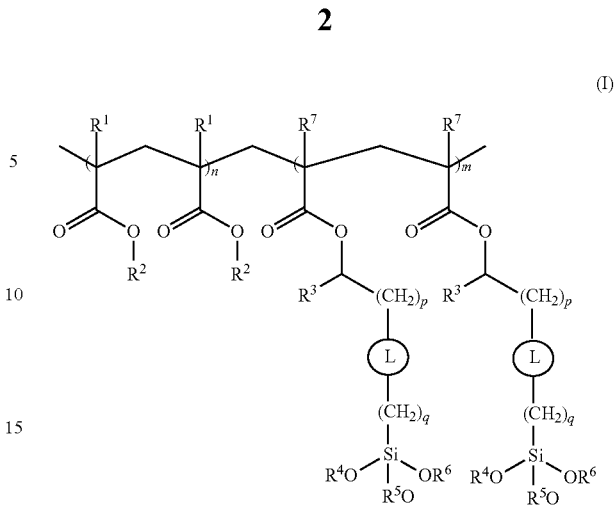

(I)

wherein m and n independent of one another, are integers ranging from 2 to 4000;

p is an integer ranging from 0 to 5;

q is an integer ranging from 1 to 5;

$R^1$ represents hydrogen, straight-chain or branched alkyl group having 1 to 4 carbon atoms;

$R^2$ represents hydrogen, straight-chain or branched alkyl group having 1 to 18 carbon atoms;

$R^3$ represents hydrogen, hydroxyl group, straight-chain or branched alkyl group having 1 to 4 carbon atoms, or an $C_6$-$C_{14}$-aryl group;

L is a single bond or bivalent group —NH—, —C(O)NH—, —NHC(O)NH—, —OC(O)NH— or —CH$_2$—;

$R^4$, $R^5$ and $R^6$ independent of one another, represent hydrogen, straight-chain or branched alkyl group having 1 to 8 carbon atoms or a polydimethylsiloxane residue; and $R^7$ represents hydrogen or methyl group.

As used herein, "n" represents the degree of polymerization of the polyacrylate block (A) of the polyacrylate-polysilane block copolymer of formula (I). In a preferred embodiment, n is in a range of from 10 to 3000, more preferably from 50 to 2500, most preferably from 100 to 1000.

As used herein "m" represents the degree of polymerization of the polysilane block (B) of the polyacrylate-polysilane block copolymer of formula (I). In a preferred embodiment, m is in a range of 10 to 3000, more preferably from 50 to 2500, most preferably from 100 to 1000.

Preferred $R^1$ groups include hydrogen, methyl, ethyl, propyl, isopropyl, butyl, iso-butyl, more preferred are hydrogen, methyl and ethyl.

Preferred $R^2$ groups include hydrogen, methyl, ethyl, propyl, isopropyl, butyl, iso-butyl, more preferred are hydrogen, methyl and ethyl. In one particularly preferred embodiment, $R^1$ is hydrogen and $R^2$ is hydrogen. In another particularly preferred embodiment, $R^1$ is methyl and $R^2$ is hydrogen.

Preferably, p is an integer ranging from 0 to 3, more preferably p is 0 or 1, most preferred p is 0.

Preferably, q is an integer ranging from 1 to 3, more preferably q is 1 or 2, most preferably q is 1. In a particularly preferred embodiment, p is 1 and q is 1.

In another particularly preferred embodiment, m is in a range of 100 to 2200, n is in a range of 100 to 2200, p is in a range of 0 to 3 and q is in a range of 1 to 3.

Preferably, $R^3$ represents hydrogen, straight-chain or branched alkyl group having 1 to 4 carbon atoms, or a $C_6$-$C_{10}$-aryl group, e.g phenyl or naphthyl. Most preferred, $R^3$ is hydrogen.

Preferably, L represents a —$CH_2$— group.

Preferably, $R^4$, $R^5$ and $R^6$ are hydrogen, straight-chain or branched alkyl group having 1 to 6 carbon atoms or a polydimethylsiloxane residue.

Preferably, $R^7$ is methyl group.

In a particularly preferred embodiment at least one of the groups $R^4$, $R^5$ and $R^6$ represent a polydimethylsiloxane residue.

Polydimethylsiloxane (PDMS) has the formula (II)

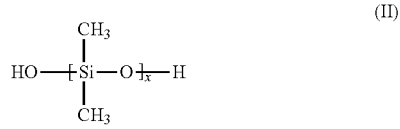

(II)

wherein x ranges from 6.5 to 4054 such that a number average molecular weight in a range of about 500 g/mole to about 300,000 g/mole results.

In a preferred embodiment, the number average molecular weight of PDMS is from 500 g/mole to 20,000 g/mole.

Preferably, the weight ratio of PDMS to the total weight of polyacrylate-polysilane block copolymer of formula (I) is in a range of 1:2.8 to 1:24023.

Another aspect of the present invention is a method to prepare a polyacrylate-polysilane block copolymer of formula (I) comprising polymerizing an acrylate polymer of formula "block (A)" and a silane polymer of formula "block (B)" in the presence of an initiator and at a reaction temperature of at most 120° C.

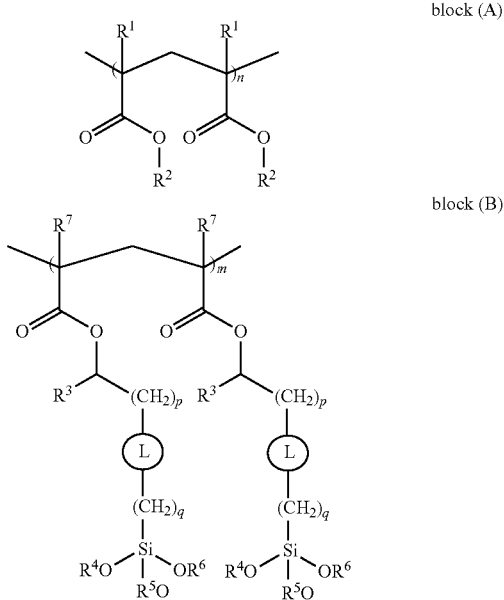

The number average molecular weight of polyacrylate block A is preferably in a range of 400 g/mole to 3.04 million g/mole, more preferably of 10,000 to 220,000 g/mole.

The number average molecular weight of polysilane block B is preferably in a range of 490 g/mole to 7,204 million g/mole, more preferably of 24,500 to 539,000 g/mole.

Expediently, the weight ratio of the polyacrylate block A to the polysilane block B in preparing the polyacrylate-polysilane block copolymer of formula (I) is in a range of 1:1.8×10$^7$ to 6204:1. The polyacrylate-polysilane block copolymer has a number average molecular weight in a range of about 890 g/mole to about 7,207 million g/mole.

The polyacrylate block (A) is formed by polymerizing an acrylate monomer in a first reaction mixture. The polymerization can be carried out by a solution, bulk, suspension or emulsion polymerization process. Suitable acrylate monomers include for example, $C_1$ to $C_{18}$ straight chain or branched alkyl esters of methacrylic acid, including methyl methacrylate, ethyl methacrylate, n-butyl methacrylate, octyl methacrylate, lauryl methacrylate, stearyl methacrylate; acrylate esters, such as $C_1$ to $C_{18}$ straight chain or branched alkyl esters of acrylic acid, including methyl acrylate, ethyl acrylate, n-butyl acrylate and 2-ethylhexyl acrylate.

The first reaction mixture may optionally contain a solvent such as water, acetone, methanol, isopropanol, tetrahydrofuran (THF), chloroform, acetone, dimethylformamide, dimethylsulfoxide, methylethylketone, or combinations thereof. The polymerization of the acrylate monomer may be in the presence of an initiator. The initiator is preferably selected based on such parameters as its solubility in one or more of the other components (e.g., monomer, solvent); half-life at the desired polymerization temperature (preferably a half-life within the range of from about 30 minutes to about 10 hours), and stability. Examples of initiators include azo compounds such as 2,2'-azobis (isobutyronitrile), 4,4'-azobis(4-cyanovaleric acid), 2,2'-azobis [2-methyl-N-(1,1-bis(hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. The concentration of initiator used during the polymerization process is preferably chosen to obtain the desired degree of polymerization. Preferably, the concentration of the initiator is from 0.2 weight percent to 3 weight percent, and more preferably from 0.5 weight percent to 1.5 weight percent, based on the weight of the monomer.

The first reaction mixture may additionally include catalysts, such as for example a transition metal chelate complex. Preferably, the transition metal chelate complex is a cobalt (II) or (III) chelate complex such as, for example, dioxime complexes of cobalt (II), cobalt (II) porphyrin complexes, or cobalt (II) chelates of vicinal iminohydroxyimino compounds, dihydroxyimino compounds, diazadihydroxyiminodialkyldecadienes, or diazadihydroxyiminodialkylundecadienes, or combinations thereof.

Said first reaction mixture is expediently heated to a temperature of 20 to 150° C., preferably to 50° C. to 80° C. The reaction may be continued for a time period of 1 to 5 hours. The solids level at the completion of the polymerization is typically from 5 weight percent to 70 weight percent, and more preferably from 30 weight percent to 60 weight percent, based on the total weight of the aqueous emulsion or suspension.

In a second reaction mixture, a silane monomer is polymerized to form the polysilane block (B) of the block copolymer of formula (I). Examples of silane monomers include (3-Acryloxypropyl)tris(trimethylsiloxy)-silane; reaction product of 2-hydroxyethyl acrylate with 3-isocyanatopropyltriethoxysilane; reaction product of 2-hydroxyethyl methacrylate with 3-isocyanatopropyltrimethoxysilane; reaction product of 2-hydroxyethyl acrylate with 3-isocyanatopropyltrimethoxysilane; reaction product of 2-hydroxyethyl methacrylate with 3-isocyanatopropyltriethoxysilane; reaction product of 3-aminopropyltrimethoxysilane with glycidyl methacrylate; reaction product of 3-aminopropyltriethoxysilane with glycidyl methacrylate, reaction product of acrylic acid with (3-aminopropyl)trimethoxysilane; reaction product of acrylic acid with (3-aminopropyl)triethoxysilane; reaction product of methacryloyloxyethyl isocyanate with (3-aminopropyl)trimethoxysilane; or reaction product of methacryloyloxyethyl isocyanate with (3-aminopropyl)triethoxysilane.

As used herein, the terms "first reaction mixture" and "second reaction mixture" is not be construed as having any restriction on the sequence of reaction process as they may be interchangeable. For example, in a reaction process the second reaction mixture may be reacted prior to first reaction mixture.

Said second reaction mixture optionally contains a solvent, such as water, acetone, methanol, isopropanol, THF, chloroform. dimethylformamide, dimethylsulfoxide, methylethylketone, or a combination thereof. The polymerization of the silane monomer may be in the presence of an initiator. Suitable initiators are those described previously with respect to the first reaction mixture. The concentration of initiator in the second reaction mixture is from 0.2 weight percent to 3 weight percent, and more preferably from 0.5 weight percent to 1.5 weight percent, based on the total weight of the silane monomer. The second reaction mixture may additionally include catalysts as mentioned previously with respect to first reaction mixture.

Preferably, the second reaction mixture is heated to a temperature in a range of about 40° C. to 75° C., more preferably to 50 to 65° C. The reaction may be continued for a time period ranging from 1 to 4 hours.

The polymerization reaction to form the polyacrylate-polysilane block copolymer of general formula (I) can be carried out by a solution, bulk, suspension or emulsion polymerization process. The polymerization process can be a continuous process, a batch or a semi-batch process. The acrylate polymer block A and the silane polymer block B are expediently polymerized in the presence of an initiator and at a reaction temperature of 40 to 120° C., preferably of 50 to 80° C. In one embodiment, the polymerization is performed by solution polymerization. In another embodiment, the polymerization is performed by bulk polymerization. The reaction may be continued for a time period of up to 5 hours, preferably of 1 to 5 hours.

In one embodiment, the polysilane block (B) of the block copolymer of formula (I) is grafted with at least one polydimethylsiloxane (PDMS) group. In one embodiment PDMS monomer such as hydroxyl-terminated PDMS is reacted with polysilane block B in the presence of a graft polymerization catalyst to form PDMS grafted polysilane block B. In another embodiment, grafting of PDMS is carried out after the polymerization reaction between polyacrylate block A and polysilane block B to form the polyacrylate-polysilane block copolymer of general formula (I).

The graft polymerization may be performed in the presence of a solvent. Suitable such solvents include water, acetone, methanol, isopropanol, tetrahydrofuran (THF), chloroform, acetone, dimethylformamide, dimethylsulfoxide, methylethylketone, or combinations thereof. The graft polymerization reaction may be initiated by means of an initiator. Suitable initiators include those described previously with respect to first reaction mixture.

Examples of graft polymerization catalysts are those selected from the group comprising of organic bases, carboxylic acids and organometallic compounds including organic titanates and complexes or carboxylates of lead, cobalt, iron, nickel, zinc and tin. Examples of catalysts include dibutyltin dilaurate (DBTL), dibutyltin dioctoate, dibutyltin diacetate, stannuous octoate, stannous oleate, lead octoate, zinc 2-ethylhexoate, cobalt naphthenate, cobalt octoate, iron 2-ethylhexoate, bis(acetylacetonyl)di-isopropyl titanate, di-isopropoxy titanium di(ethylacetoacetate), tetrabutyl titanate, tetranonyl titanate, ethylene glycol titanate, tetrabutyl zirconate, ethylamine, hexylamine, dibutylamine, piperidine, ethylene diamine, octadecylamine acetate, p-toluene sulphonic acid and acetic acid. The preferred catalysts are organic tin compounds, e.g. dibutyltin dilaurate and dibutyltin diacetate. The catalyst is preferably added in an amount of from about 0.01 to about 1 percent by weight, more preferably about 0.05 to about 0.5 percent by weight, and most preferably about 0.1 to 0.2 percent by weight of the component polymers.

The graft polymerization reaction mixture is heated to a temperature in a range of about 40° C. to 75° C., more preferably to 50 to 65° C. The reaction may be continued for a time period ranging from 1 to 5 hours, preferably from 1 to 3 hours.

The polyacrylate-polysilane block copolymers may enhance surface appearance with respect to less scratching of a polymer due to the low surface energy of the polysilane block and at the same time have good compatibilty with other polymers due to the polyacrylate block. In one particular application, the inventive block copolymer may enhance the scratch-resistance of a polymer, such as polyolefin, when blended therewith.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, the examples are not intended to limit the invention, as defined in the appended claims, in any manner.

As used herein, a glass transition temperature (Tg) of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. For a block copolymer, one Tg can be measured, or calculated, for the phase formed by the polyacrylate block, and another Tg for the phase formed by the polysilane block. An "average Tg", or "overall Tg" may be calculated for such systems as a weighted average of the amount of polymer in each phase of a given Tg.

The molecular weight of synthetic polymers are almost always a mixture of chains varying in molecular weight, i.e., there is a "molecular weight distribution" as referred by polydispersity. Given that there is a distribution of molecular weights, the most complete characterization of the molecular weight of a given sample is the determination of the entire molecular weight distribution. This characterization is obtained by separating the members of the distribution and then quantitating the amount of each that is present. As used herein, the terms "number average molecular weight ($M_n$)" and "weight average molecular weight ($M_w$)" are determined by gel permeation chromatography (GPC).

EXAMPLES

Example 1 a) Synthesis of Silane Polymer:

A three-necked round bottom (RB) flask was attached with a condenser and a Schlenk line for purging with nitrogen. The RB flask was placed over a stirrer and a hot plate with heat on block. Nitrogen gas was flushed through preheated and dried RB flask to remove any moisture content prior to polymerization.

About 10 grams of methacryloxypropyltrimethoxysilane was taken in the RB flask and temperature was raised to 63° C. Azobisisobutyronitrile (AIBN) (0.04 g) was added dropwise into the RB flask. The onset of the reaction is marked with increase in viscosity of the reaction mixture. The heating and stirring was continued for another 2 hours. The reaction mixture was cooled down.

b) Synthesis of Acrylate Polymer:

About 40 grams methyl methacrylate (MMA) along with 100 millilitres (mL) of tetrahydrofuran (THF) was taken in a three-necked RB flask which has been purged with nitrogen. The temperature of the reaction mixture was raised to 60° C. Nitrogen atmosphere was maintained through the Schlenk line. After the temperature was attained, 0.16 g of azobisisobutyronitrile (AIBN) was added to the reaction mixture. The onset of the reaction is marked by solids formation. The reaction was continued for 1 hour. A sample was withdrawn from the reaction mixture after 1 hour for further characterization. The acrylate polymer obtained from this Example was characterized using NMR. The NMR data $^1$H NMR (400 MHz, CDCl$_3$) δ3.7-3.5 [COOC$\underline{H}_3$], δ2.0-1.5 [C(CH$_3$)C$\underline{H}_2$], 1.5-0.5 [C(C$\underline{H}_3$)CH$_2$] confirms the formation of the polymer. The molecular weight analysis was performed in chloroform solvent using GPC with polystyrene standards and is listed in Table 1. The acrylate polymer has a weight average molecular weight ($M_w$) of 209,000, a number average molecular weight ($M_n$) of 73,000 g/mole and a polydispersity of 2.8.

c) Synthesis of Block Copolymer:

About 1.6 g of reaction mixture containing silane polymer of Example 1a was taken under inert atmosphere and added to the flask of Example 1b. The reaction was continued for further 1 hour and then about 10 g of polydimethylsiloxane (PDMS $M_n$ 500 g/mole) was added to the RB flask along with 0.2 g of dibutyltin dilaurate (DBTDL). The reaction was continued for further 2 hours and precipitated out in excess methanol. The resulting product was then filtered and dried in vacuum oven at 40° C. for 24 hours to remove traces of methanol from the product. The block copolymer product thus obtained was then weighed to get a yield of 89% and used for further characterisation. The block copolymer formation is confirmed by NMR from the appearance of peak at δ0.3-0.0 corresponding to [Si—C$\underline{H}_3$]. The molecular weight analysis of block copolymer was performed in chloroform solvent using GPC with polystyrene standards and is listed in Table 1. The block copolymer has a weight average molecular weight ($M_w$) of 240,000, a number average molecular weight ($M_n$) of 105,000 and a polydispersity of 2.3 as shown in Table 1.

TABLE 1

GPC data of acrylate and block copolymers

| Example | $M_w$ (g/mole) | $M_n$ (g/mole) | Polydispersity |
| --- | --- | --- | --- |
| 1b | 209,000 | 73,000 | 2.8 |
| 1c | 240,000 | 105,000 | 2.3 |

Tg of the polymer was recorded using DSC (Perkin Elmer DSC 6000) at a heating rate of 10° C./min. The block copolymer exhibits two Tg (the first Tg corresponding to PDMS appear at around 50° C. to 70° C. and the second Tg corresponding to acrylate appear between 140° C. and 150° C.

The TGA (Thermogravimetric Analysis) of the block copolymer was measured using Perkin Elmer TGA 4000 to know the degradation temperature. A sample of the block copolymer was heated under nitrogen atmosphere and the heating was continued to a temperature of up to 700° C. at the rate of 20° C. per minute. The TGA of the block copolymer shows onset of degradation at a temperature of 250° C. which indicates the suitability of these block polymers in conventional polymer processing methods.

Example 2 a) Synthesis of Silane Polymer

About 13 g of hydroxyethylmethacrylate is taken in a RB flask and into it is added 20.5 g of 3-isocyanatopropyltrimethoxy silane. The RB flask is flushed with nitrogen and nitrogen bubbling is continued throughout the period of reaction. 0.04 g of dibutyl tin dilaurate (DBTDL) is added to the reaction mixture and temperature is raised to 65° C. The reaction is continued for about 1 hour. The completion of the reaction is marked by the disappearance of the isocyanate peak at 2270 cm$^{-1}$ using Infrared (IR) spectroscopy.

10 g of reaction product is taken in a RB flask under nitrogen and 0.03 g of AIBN is added to it. The temperature is raised to 63° C. and the reaction is continued with constant heating for about two hours under nitrogen atmosphere. The reaction mixture is cooled and kept under nitrogen atmosphere till further use.

b) Synthesis of Acrylate Polymer:

About 30 g of MMA is taken in a RB Flask with 250 mL of THF. About 0.4 g of AIBN is added to the flask. The temperature is raised to 63° C. and heating is continued for 1 hr. The onset of polymerization is observed by solids formation in the reaction mixture.

c) Synthesis of Block Copolymer

The product from Example 2a is added under inert condition to the RB flask of Example 2b and the reaction is continued for one more hour. About 7.5 g of PDMS ($M_n$ 500 g/mole) along with 0.18 g of DBTDL is added to the reaction mixture and the reaction is continued for two more hours. At the end of the reaction, the block copolymer product is precipitated in excess of methanol and dried. The product can be characterized by NMR, DSC and TGA.

Example 3 a) Synthesis of Silane Polymer

About 10 grams of methacryloxypropyltrimethoxysilane was taken in a RB flask and temperature was raised to 63° C. About 0.04 g of AIBN was added slowly into the RB flask. The onset of the reaction was marked by increase in viscosity of the reaction mixture. The heating and stirring was continued for another 2 hours. The reaction mixture was cooled down.

b) Synthesis of Acrylate Polymer

Acrylic acid 7.2 g was taken in a RB Flask containing 100 ml of toluene attached to Dean stark apparatus. 1-octanol (13 g) was added to it along with 0.2 g of para toluene sulphonic acid (PTSA). The reaction mixture was refluxed. The completion of reaction was marked by the disappearance of the hydroxyl peak of 1-octanol between 3200-3400 cm$^{-1}$ by IR spectroscopy. The reaction was stopped after 4 hours following the disappearance of hydroxyl peak. The reaction product was dissolved in dichloromethane and washed with water. It was dried over anydrous sodium sulphate and concentrated using rotavapor. About 20.2 g of the reaction product was taken in a RB flask under nitrogen atmosphere and heated for two hours in the presence of 0.2 g of AIBN catalyst. A small portion of the product was added to methanol which precipitated out confirming polymer formation. The product was cooled down and kept under nitrogen atmosphere.

c) Synthesis of Block Copolymer

To the product of Example 3b was added 2.7 g of product of Example 3a under nitrogen atmosphere. The reaction was continued for 1 hour. About 2.7 g of PDMS ($M_n$ 500 g/mole) along with 0.05 g of DBTDL was added to the reaction mixture with continued heating for 2 hours. The reaction mixture was cooled down and precipitated in excess methanol, filtered, dried and used for further characterization.

The invention claimed is:

1. A polyacrylate-silane polymer block copolymer of general structure (I):

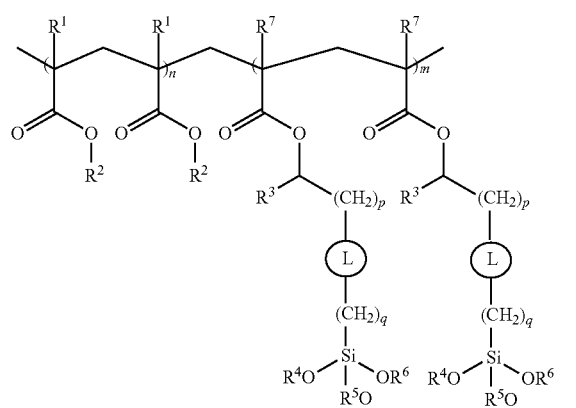

(I)

wherein
m and n independent of one another, are integers ranging from 2 to 4000;
p is an integer ranging from 0 to 5;
q is an integer ranging from 1 to 5;
$R^1$ represents hydrogen, straight-chain or branched alkyl group having 1 to 4 carbon atoms;
$R^2$ represents hydrogen, straight-chain or branched alkyl group having 1 to 18 carbon atoms;
$R^3$ represents hydrogen, hydroxyl group, straight-chain or branched alkyl group having 1 to 4 carbon atoms, or an $C_6$-$C_{14}$-aryl group;
L is a single bond or a bivalent group —NH—, —C(O)NH—, —NHC(O)NH—, —OC(O)NH— or —CH$_2$—;

$R^4$, $R^5$ and $R^6$ independent of one another, represent hydrogen, straight-chain or branched alkyl group having 1 to 8 carbon atoms or a polydimethylsiloxane residue; and
$R^7$ represents hydrogen or methyl group, and
wherein at least one of $R^4$, $R^5$ and $R^6$ represents a polydimethylsiloxane group.

2. The block copolymer as claimed in claim 1, wherein m is an integer ranging from 100 to 1000.

3. The block copolymer as claimed in claim 1, wherein n is an integer ranging from 100 to 1000.

4. The block copolymer as claimed in claim 1, wherein p is an integer ranging from 0 to 3.

5. The block copolymer as claimed in claim 1, wherein q is an integer ranging from 1 to 3.

6. The block copolymer as claimed in claim 1, wherein the weight ratio of the polyacrylate block (A) to the silane polymer block (B) is in the range of about 1:1.8×10$^7$ to 6204:1.

7. The block copolymer as claimed in claim 1, wherein the number average molecular weight of the polydimethylsiloxane group is in the range of about 500 g/mole to about 300,000 g/mole.

8. The block copolymer as claimed in claim 1, wherein the weight ratio of the polydimethylsiloxane group to the total weight of the polyacrylate-polysilane block copolymer of general structure (I) is in the range of 1:2.8 to 1:24023.

9. The block copolymer as claimed in claim 1, wherein $R^1$ represents hydrogen, methyl or ethyl.

10. The block copolymer as claimed in claim 1, wherein $R^2$ represents hydrogen, methyl or ethyl.

11. The block copolymer as claimed in claim 1, wherein $R^3$ represents hydrogen.

12. A method for preparing a polyacrylate-silane polymer block copolymer as claimed in claim 1, comprising the step of polymerizing an acrylate polymer of formula "block (A)" and a silane polymer of formula "block (B)" at a reaction temperature of at most 120° C.

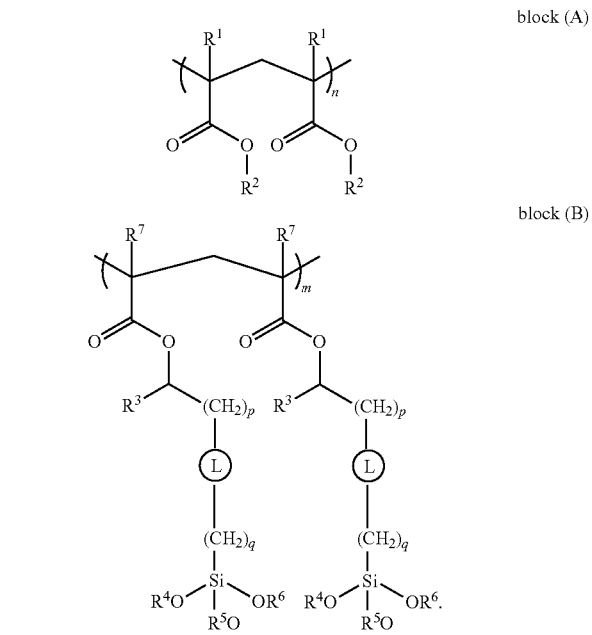

13. A polymer blend comprising the block copolymer as claimed in claim 1 to enhance scratch-resistance of polymers.

* * * * *